US007237685B2

(12) United States Patent
Keegan et al.

(10) Patent No.: US 7,237,685 B2
(45) Date of Patent: Jul. 3, 2007

(54) STORAGE RACK WITH TAPERED SLOTS

(75) Inventors: Daniel J. Keegan, Riviera Beach, FL (US); David D. Sargent, Riviera Beach, FL (US)

(73) Assignee: Green Touch Industries, Inc., Lake Park, FL (US)

( * ) Notice: Subject to any disclaimer, the term of this patent is extended or adjusted under 35 U.S.C. 154(b) by 234 days.

(21) Appl. No.: 10/959,543

(22) Filed: Oct. 6, 2004

(65) Prior Publication Data
US 2006/0070965 A1  Apr. 6, 2006

(51) Int. Cl.
*A47F 7/00* (2006.01)
(52) U.S. Cl. ..................... 211/70.8; 211/60.1
(58) Field of Classification Search .............. 211/61, 211/67, 68, 70.1, 70.2, 70.5, 70.7, 70.8, 124, 211/89.01, 120
See application file for complete search history.

(56) References Cited

U.S. PATENT DOCUMENTS

| RE4,520 E | * | 8/1871 | Cooley | 211/67 |
|---|---|---|---|---|
| 138,676 A | * | 5/1873 | Mitchell | 211/67 |
| 158,208 A | * | 12/1874 | Hall | 211/67 |
| 335,765 A | * | 2/1886 | McPherson | 211/67 |
| 429,987 A | * | 6/1890 | Wilson et al. | 211/67 |
| 576,254 A | * | 2/1897 | Bortlik | 211/67 |
| 1,533,942 A | * | 4/1925 | Parrish | 294/5.5 |
| 2,436,687 A | * | 2/1948 | Corbett | 206/315.6 |
| 4,960,212 A | * | 10/1990 | Wu | 211/70.2 |
| 4,967,914 A | * | 11/1990 | Keeton | 211/70.7 |
| 5,396,994 A | * | 3/1995 | Fitzgerald | 211/32 |
| 5,505,316 A | * | 4/1996 | Lee | 211/70.6 |
| 5,617,951 A | * | 4/1997 | Wick | 206/315.6 |
| 5,678,700 A | * | 10/1997 | Crosson, Jr. | 211/70.8 |
| 5,860,573 A | * | 1/1999 | Hossack et al. | 224/483 |
| 6,412,735 B1 | * | 7/2002 | Mathieu | 248/110 |
| 6,536,588 B1 | * | 3/2003 | Kyrwood | 206/315.6 |
| 2004/0022607 A1 | * | 2/2004 | Lim et al. | 414/222.01 |

* cited by examiner

*Primary Examiner*—Jennifer E. Novosad
(74) *Attorney, Agent, or Firm*—Paul, Hastings, Jenofsky + Walker, LLP

(57) ABSTRACT

Storage devices allow for the efficient storage of objects which include a substantially cylindrical member such as a fishing rod. The storage device includes a support member which is coupled to a retaining member. The retaining member includes multiple protruding members positioned substantially perpendicular to the support member to form multiple tapered slots which can have openings of varying widths. The substantially cylindrical member of an object is inserted into the tapered slot to create a friction fit to retain the object in a substantially vertical position.

48 Claims, 7 Drawing Sheets

STORAGE RACK WITH TAPERED SLOTS

BACKGROUND

1. Field of the Inventions

The field of the invention relates generally to storage devices and more particularly to rack-type devices for storing multiple, cylindrical objects such as fishing rods.

2. Background Information

There are a number of everyday objects that include a cylindrical handle or other cylindrical member. Rakes, brooms, shovels and other tools typically include an extended cylindrical handle with an implement attached to its end. Similarly, fishing rods include a long cylindrical portion with a reel attached at one end of the rod, and guides attached at intervals along the length of the rod. While all of these products help to make everyday life a little easier, the awkward shape and unique configuration of these products can make it difficult to safely and efficiently store them. For the reasons discussed below, these difficulties are particularly relevant to the storage of fishing rods.

Fishing rods have been used for decades to catch fish of all species, shapes and sizes. With improvements in technology, available materials, and better construction techniques, the fishing rods used today offer incredibly high performance. But the one universal that remains is the fact that these fishing rods can still be broken quite easily. Oftentimes, the fishing rod is not broken or damaged while it is being used at the water, but rather when it is stored between uses.

The difficulty in safely, effectively and efficiently storing fishing rods is caused by a number of factors. First, fishing rods are designed to be strong while retaining a significant amount of flexibility. This requires the rod to be constructed from a lightweight material. In addition, the diameter of the fishing rod is often quite small, particularly at the tip of the fishing rod. These factors result in a fishing rod that can be easily broken if the rod is not handled or stored correctly.

Second, fishing rods typically include a number of guides which are periodically spaced down the length of the fishing pole. These guides function to route the fishing line from the reel to the rod tip and allow for smooth casting and retrieval of the bait or lure. Typically, each guide consists of a ring that is connected to at least two supporting members. The supporting members are then coupled to the rod with a wrap. The wrap consists of a length of thread-like material that is repeatedly wound around the rod to secure the supporting members of the guide to the rod. Because these guides protrude from the body of the fishing rod, they can be easily snagged and broken.

Third, fishing rods usually include a reel that is attached toward the handle-end of the fishing rod. The reel is wider than the fishing rod itself because the reel includes a housing to store a volume of fishing line. The reel also includes a handle which is used to retrieve the fishing line. The handle extends even further from one side of the reel, causing the reel to be even wider than the rod. Therefore, to store multiple fishing rods adjacent to each other, an increased amount of storage space is needed, not because of the fishing rods, but rather because of the additional width added by the reel and its handle.

Current devices for storing fishing rods typically require a device that capitalizes on the increased width of the reel portion of the fishing rod when the fishing rod is oriented vertically. To do this, the device includes a hole through which the handle-end of the fishing rod is inserted. When the fishing rod is oriented vertically, the hole is sized such that the reel cannot pass through. Instead, the device carries the weight of the rod based on contact with the reel.

In some case, current storage systems require a second, additional component which is configured to align the tips of the fishing rods after they have been supported near the handle-end of the fishing rod. However, in these system, all of the reels of the fishing rods are at the same level when they rest on the support member. Therefore, a significant amount of storage space is lost when the reels are placed directly adjacent to each other, because the device must account for the total widths of the various reel positions.

Other methods for storing fishing rods also require a two-piece system but attempt to orient the reels in a manner to maximize storage space. These systems operate similarly to those described above but require an additional, top component which also includes a hole through which the tip of the rod must be inserted. The weight of the reel is then supported by the top component as the rod hangs down in a vertical position. Therefore, rather than placing all of the reels adjacent to each other on the bottom support member, these storage devices require the rods to be inserted into the storage system in alternating directions. For example, if one rod has its reel supported by the bottom support member, the adjacent rod must have its reel supported by the top support member.

Similar systems have also been implemented to store the rods in a horizontal manner. However, the rods must still be placed in alternating directions and carefully guided through the dual openings which support the weight of the rods.

The storage systems described above cause several difficulties, particularly when considering the fragile nature of the rod itself as well as the guides that are spaced down the length of the fishing rods. Current storage systems which rely on supporting the weight of the reel of the fishing rod often require careful insertion of the rod and the guides through relatively small openings. During this process of manipulation, the guides or the fishing rod itself can be easily broken and the fishing line can easily become tangled. These problems are further magnified as fishing rods are typically stored in crowded areas such as a garage, basement, closet, or even a boat, mobile home, or camper. Thus, if the fishing rods are not stored efficiently, they can be accidentally damaged as other items are moved or stored around them.

SUMMARY OF THE INVENTION

A storage device that allows for the efficient storage of objects that include a substantially cylindrical member such as a fishing rod. The storage device comprises a support member that is coupled to a retaining member. The retaining member comprises at least two protruding members arranged substantially perpendicular to the support member, forming a tapered slot. The substantially cylindrical member of an object may be inserted into the tapered slot using pressure to create a friction fit to retain the object in a substantially vertical position.

In another aspect, the retaining member may comprise three or more protruding members forming multiple tapered slots which may form openings of the same or varying widths. When the openings have different widths the tapered slots may receive substantially cylindrical objects having various diameters.

In another aspect, systems and methods for storing fishing rods or other substantially cylindrical items in a storage device are disclosed. The storage device comprises a support member that is coupled to a retaining member. The retaining member comprises at least three protruding members arranged substantially perpendicular to the support member, forming multiple tapered slots. In one embodiment, a wrap which secures a guide to a fishing rod is inserted into a first tapered slot to create a friction fit and position the reel of the fishing rod at a first position. A wrap of a second fishing rod is then inserted into a tapered slot which is adjacent to the first tapered slot. A specific wrap of the second fishing rod is selected to be inserted into the tapered slot such that the reel of the second fishing rod is positioned at a second position that can be either be above or below the first position of the reel of the first fishing rod. By adjusting the relative vertical positions of the reels of adjacent fishing rods to prevent interference, the storage device allows for the storage of the maximum possible number of fishing rods in the relatively smallest possible area.

BRIEF DESCRIPTION OF THE DRAWINGS

Features, aspects, and embodiments of the inventions are described in conjunction with the attached drawings, in which.

DETAILED DESCRIPTION OF THE PREFERRED EMBODIMENTS

The storage device described herein allows for the efficient storage of a number of everyday objects that include a cylindrical handle or other cylindrical member. It is particularly adapted to store small radius, cylindrical items. While the storage device can be particularly useful in storing fishing rods, the tapered slots of the retaining member can be used to retain the cylindrical handles of brooms, rakes, shovels, and other tools and objects. Also, while the storage device can easily be implemented in garages, storage rooms, basements, as a display rack in a commercial store, or even in boats, campers and mobile homes, there is no limit to the locations where the storage device can be implemented. The storage device of the present invention is versatile, and allows for storage in both the horizontal and vertical direction.

Figure 1:
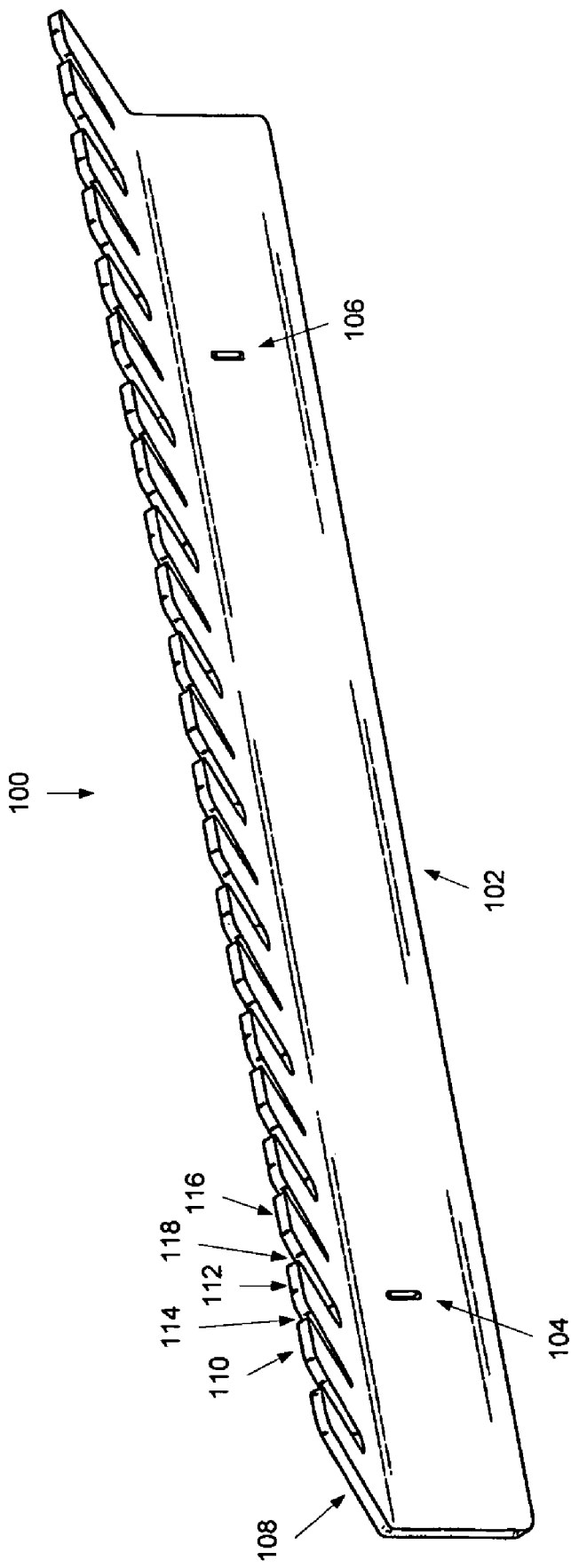
FIG. 1 is a diagram illustrating a storage device with an example embodiment of the invention.

Turning now to FIG. 1, an exemplary embodiment of the storage device 100 is shown. Storage device 100 includes support member 102. In one embodiment, support member 102 is adapted to be mounted to a flat surface such as a wall, although the rack can be configured to conform with virtually any surface. Therefore, support member 102 is preferably substantially flat such that support member 102 can be mounted substantially coplanar to the flat surface of a typical wall. In another embodiment, support member 102 includes mounting holes 104 and 106. Mounting holes 104 and 106 are provided to allow a fastening device such as a nail, screw or bolt to secure storage device 100 to a surface. Support member 102 can be of any desirable length, width, and thickness. However, it is important that support member 102 is dimensioned to provide sufficient support for the storage device 100 when it is mounted to a surface and carrying a load.

Retaining member 108 is coupled to support member 102. In one embodiment, retaining member 108 includes at least two protruding members such as protruding member 110 and protruding member 112. Protruding members 110 and 112 can be arranged substantially perpendicular to support member 102 to form tapered slot 114. As used herein, the term tapered slot should not be limited to any one particularly type of opening. Rather, the term tapered slot can refer to any type of gap, aperture, notch, indentation, opening or groove made by any method, so long as the distance at the opening of the slot is greater than the distance at the heel of the slot.

In another embodiment, retaining member 108 includes at least three protruding member such as protruding members 110, 112 and 116. Again, protruding members 110, 112 and 116 can be arranged substantially perpendicular to support member 102 to form tapered slots 114 and 118. As described in more detail below with reference to FIG. 2, tapered slots 114 and 118 can be configured to have openings of different widths to accommodate objects having diameters of various dimensions. While each individual protruding member has not been numbered in FIG. 1, it can be appreciated that retaining member 108 can include any number of protruding members. Accordingly, in one embodiment, retaining member 108 includes a plurality of protruding members which form a plurality of tapered slots as shown in FIG. 1.

In addition, the distance between protruding members of retaining member 108 can be varied to create tapered slots of different sizes. By varying the width of the protruding members, the width of the tapered slots can be varied to store items of different sizes. Therefore, the storage device can provide even more convenience to store a wide variety of objects. The support member, retaining member, and protruding member can be made from steel, cast iron, aluminum, plastic or any other structural material adapted to support the objects for which the rack is designed to support. The retaining member, support member, and protruding members can be independent parts, or can be cast, forged, molded, or otherwise constructed to be one integral piece. In one embodiment, the junction of retaining member 108 and support member 102 forms an angle of ninety degrees or greater to facilitate the insertion and storage of a cylindrical object.

Figure 2:
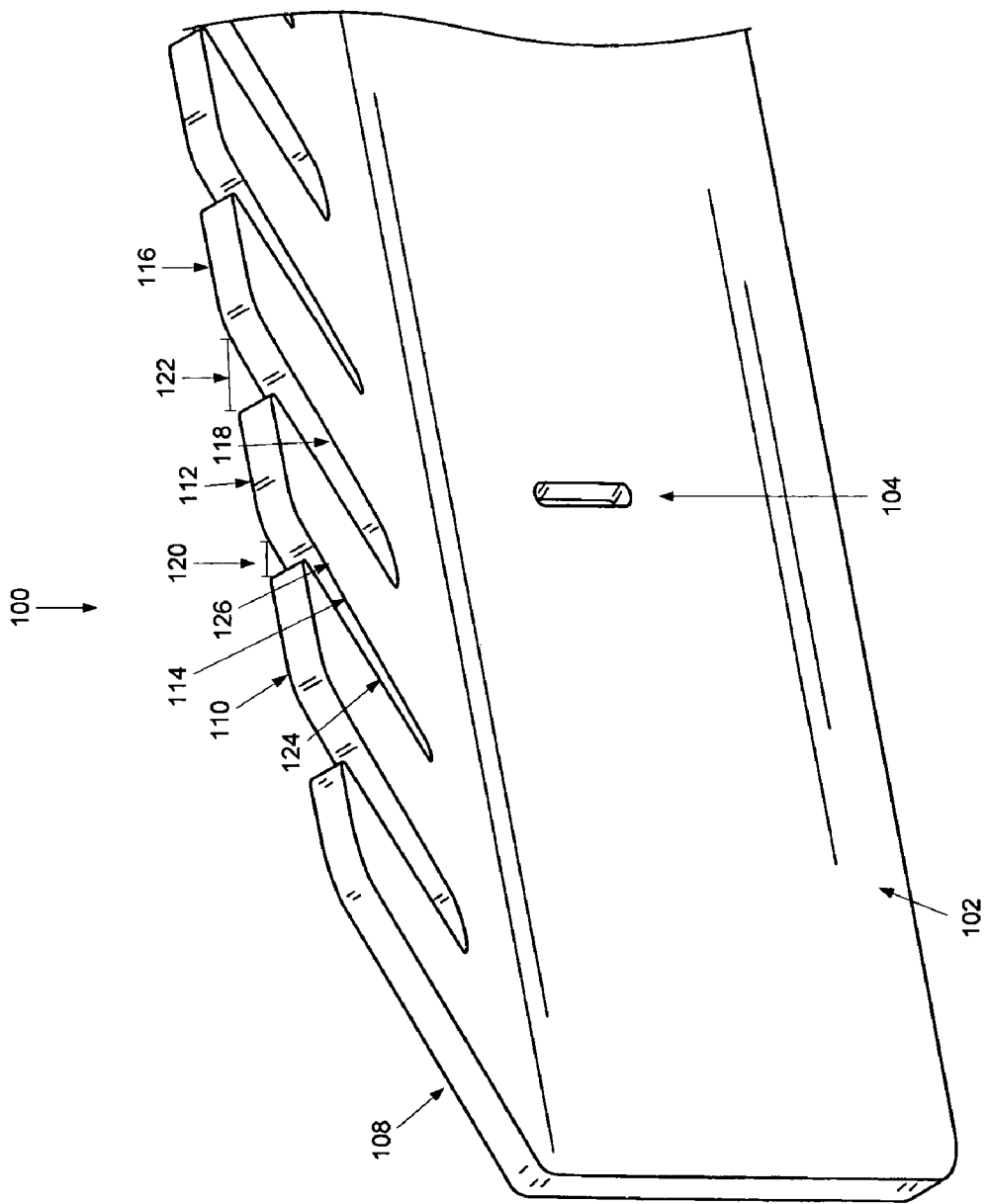
FIG. 2 is a close up view of the tapered slots of an example embodiment of the invention.

Turning now to FIG. 2, a close up view of a section of storage device 100 is illustrated. Retaining member 108 includes protruding members 110, 112 and 116 that define tapered slots 114 and 118. Further, protruding members 110 and 112 also define an opening 120 of tapered slot 114. Similarly, protruding members 112 and 116 also define an opening 122 of tapered slot 118.

In one-embodiment, the width of opening 122 of tapered slot 118 is greater than the width of opening 120 of tapered slot 114. Accordingly, tapered slot 118 is capable of receiving an object having a larger diameter than that which tapered slot 114 can receive. In a preferred embodiment, the opening of tapered slot 118 is approximately 0.64 inches and the width of the heel of tapered slot is approximately 0.40 inches. In another preferred embodiment, the opening of tapered slot 120 is approximately 0.43 inches and the width of the heel of tapered slot is approximately 0.19 inches. While tapered slots 114 and 118 demonstrate an exemplary embodiment, it should be understood that storage device 100 can include any number of tapered slots having openings of varying widths. FIG. 2 also illustrates that tapered slot 114 is formed by sides 124 and 126.

Figure 3:
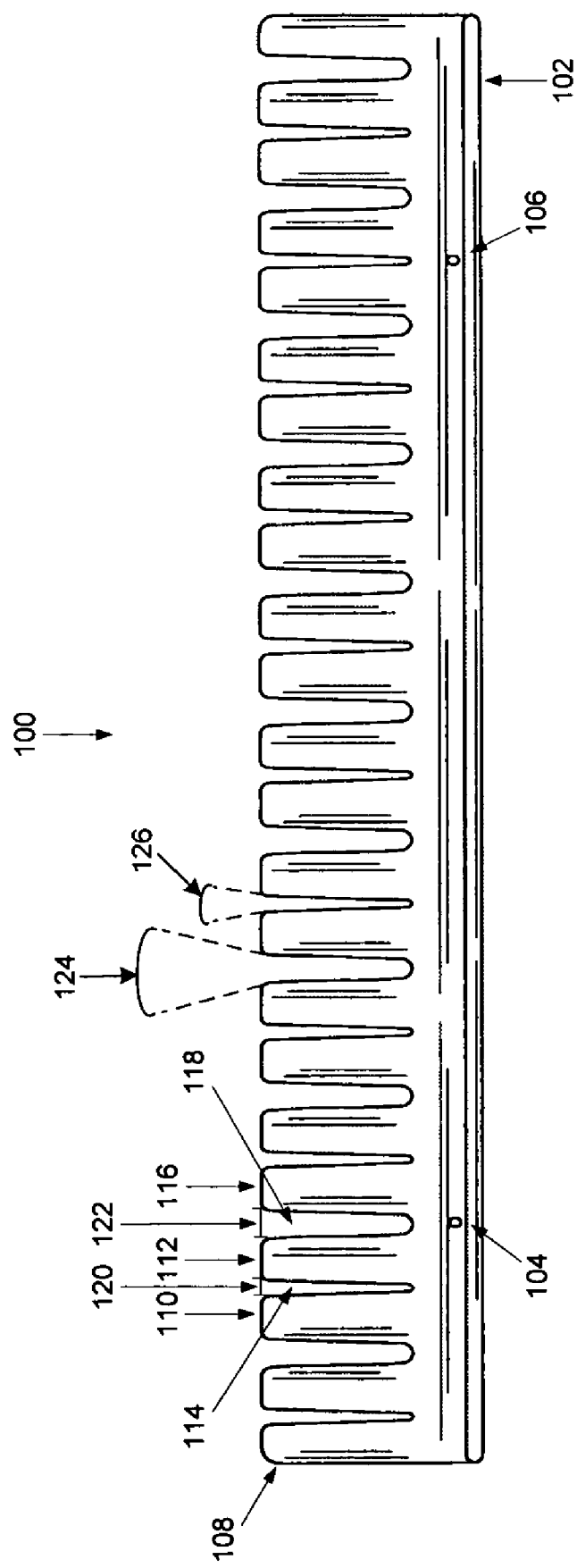
FIG. 3 is another diagram illustrating a storage device with an example embodiment of the invention.

Turning now to FIG. 3, another view of storage device 100 is illustrated. As discussed previously, storage device 100 can include support member 102 with mounting holes 104 and 106. Retaining member 108 can include protruding members 110, 112 and 116 which define tapered slots 114 and 118. Further, protruding members 110 and 112 also define an opening 120 of tapered slot 114. Similarly, protruding members 112 and 116 also define an opening 122 of tapered slot 116.

In one embodiment, the width of opening 122 of tapered slot 118 is greater than the width of opening 120 of tapered slot 114. Accordingly, tapered slot 118 is capable of receiving an object having a larger diameter than that which tapered slot 114 can receive. While tapered slots 114 and 118 demonstrate an exemplary embodiment, it should be understood that storage device 100 can include any number of tapered slots having openings of varying widths.

FIG. 3 also illustrates that tapered slots 114 and 118 are characterized by a taper angle. For clarity of illustration, taper angles 124 and 126 have been illustrated with reference to tapered slots other than tapered slots 114 and 118. However, it can be appreciated that each tapered slot is characterized by a taper angle. Taper angles 124 and 126 are formed as the width of tapered slot is reduced as the tapered slot moves towards support member 102. The taper angle should be configured to optimize the ability of the tapered slot to retain a cylindrical object through a friction fit.

In one method to determine the optimal taper angle for the tapered slots of the storage device, smooth steel measuring one quarter inch thick was scissored together with a five sixteenths inch round steel shaft inserted near the pivot point. The shaft was repelled until the angle was such that the round shaft became lodged. This angle was then measured and became the angle used for the taper angle of the tapered slots of storage device 100.

Using the method described above, it was determined that a tapered slot having a taper angle ranging from approximately 30 degrees down to less than 1 degree can provide the requisite structure to create a friction fit for retaining a cylindrical object. A reduced taper angle provides a more secure friction fit. However, as the taper angle is reduced, the length of the slot must be increased to accommodate the diameter of typical objects that are stored with the storage device. Therefore, a tapered slot having a taper angle ranging from approximately 5 degrees to 15 degrees is preferred as tapered slots having these dimensions enable a highly efficient friction fit and allow the tapered slot to have an optimally sized length. Finally, in the most preferred embodiment, the taper angle of the tapered slot is approximately 9.53 degrees.

In one embodiment, although tapered slot 114 and tapered slot 118 have openings with different widths as discussed above, the taper angle of both tapered slots is substantially equal. This is due to the fact that regardless of the diameter of the object that is intended to be retained by the tapered slot, the optimal taper angle, discussed above, provides the best friction fit to retain the object in the tapered slot.

Figure 4:
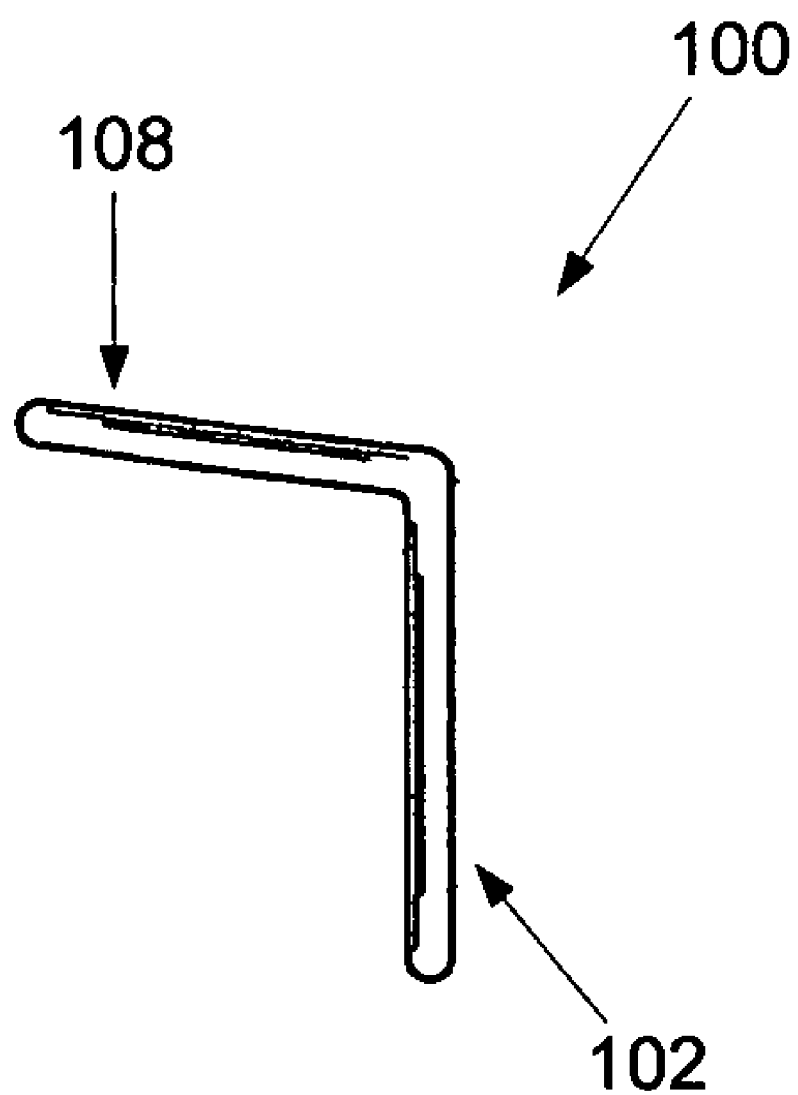
FIG. 4 is an end view illustrating a storage device with an example embodiment of the invention.

FIG. 4 illustrates an end view of storage device 100. Storage device 100 includes support member 102 coupled to retaining member 108. In one embodiment, the angle formed between support member 102 and retaining member 108 is greater than ninety degrees.

In one embodiment, support member 102 is adapted to be mounted to a surface such as a wall. Therefore, as illustrated in FIG. 4, support member 102 is preferably substantially flat such that support member 102 can be mounted substantially coplanar to the flat surface of a typical wall. Support member 102 can be mounted to a surface such as a wall with standard fastening devices such as a nails, screws or bolts.

Figure 5:
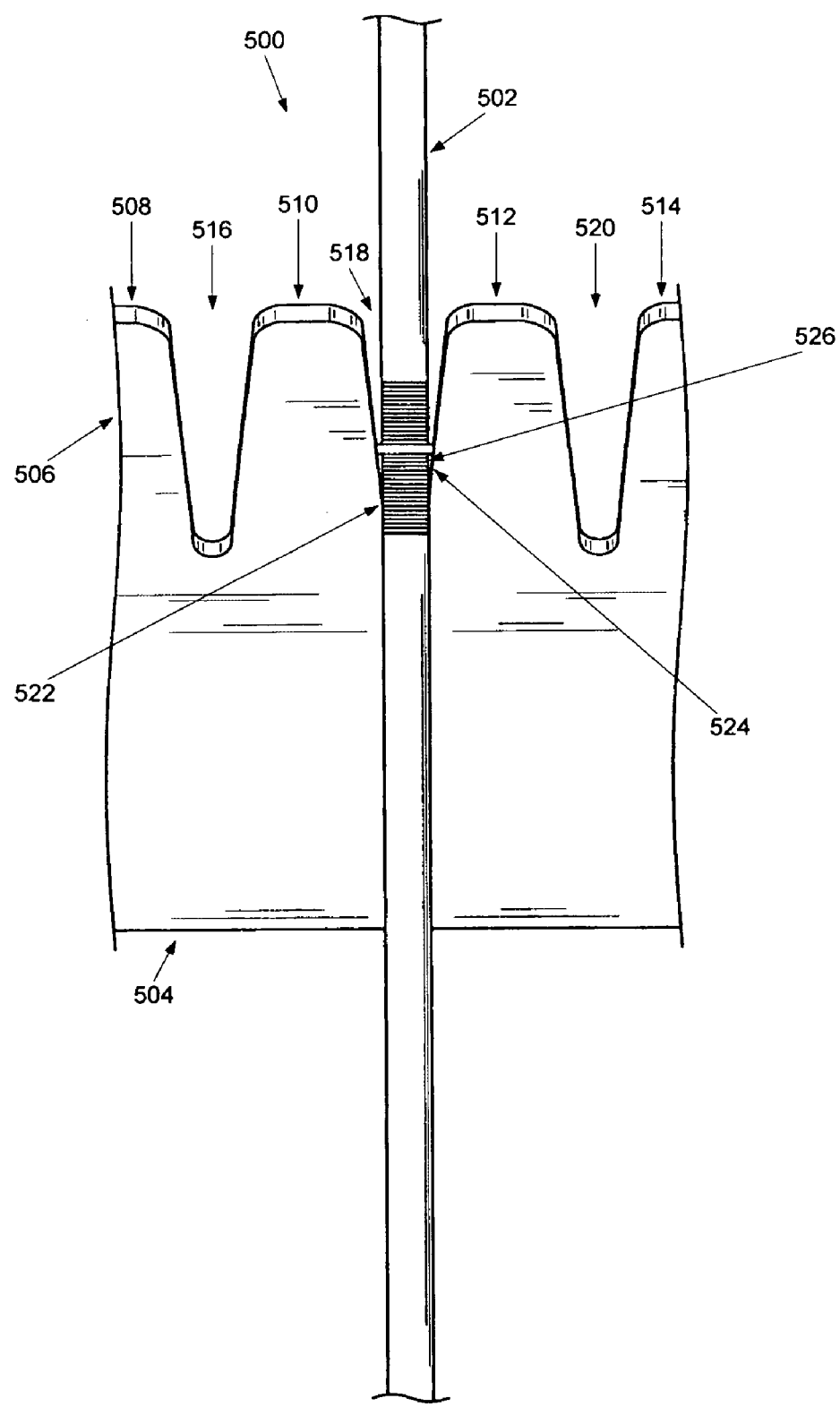
FIG. 5 illustrates an exemplary embodiment of the storage device being used to store a fishing rod.

Turning now to FIG. 5, one embodiment of storage device 500 is illustrated in an exemplary use as a storage device for retaining fishing rod 502. Storage device 500 includes support member 504 and retaining member 506. In one embodiment, retaining member 506 includes protruding members 508, 510, 512 and 514. Protruding members 508 and 510 define tapered slot 516, protruding members 510 and 512 define tapered slot 518, and protruding members 512 and 514 define tapered slot 520.

Tapered slot 518 includes an opening sufficiently large to receive the diameter of fishing rod 502. After fishing rod 502 passes through the opening of tapered slot 518, fishing rod 502 is pushed further back into tapered slot 518 towards support member 504. Ultimately, the width of tapered slot 518 reaches a point where it contacts fishing rod 502 at contact points 522 and 524. As discussed above, in one embodiment, tapered slot 518 includes an optimal taper angle such that tapered slot 518 does not repel fishing rod 502 when it contacts the wall of tapered slot 518 at contact points 522 and 524. Instead, the taper angle promotes a friction fit between fishing rod 502 and tapered slot 518, thereby retaining fishing rod 502 in place. Fishing rod 502 is then positioned in a substantially vertical position with the tip of fishing rod 502 above storage device 500 and the reel and handle-end of fishing rod 502 positioned below storage device 500.

In one embodiment, any portion of fishing rod 502 is inserted into tapered slot 518. The friction fit established by tapered slot 518 is sufficient to hold fishing rods having a relatively light weight when any portion of the fishing rod contacts the tapered slots at contact points 522 and 524. However, in another embodiment, a typical fishing rod which has a standard or heavier weight than the light fishing rod discussed above, can be more securely retained by tapered slot 518 based on the manner in which fishing rod 502 is placed into tapered slot 518.

Figure 6:
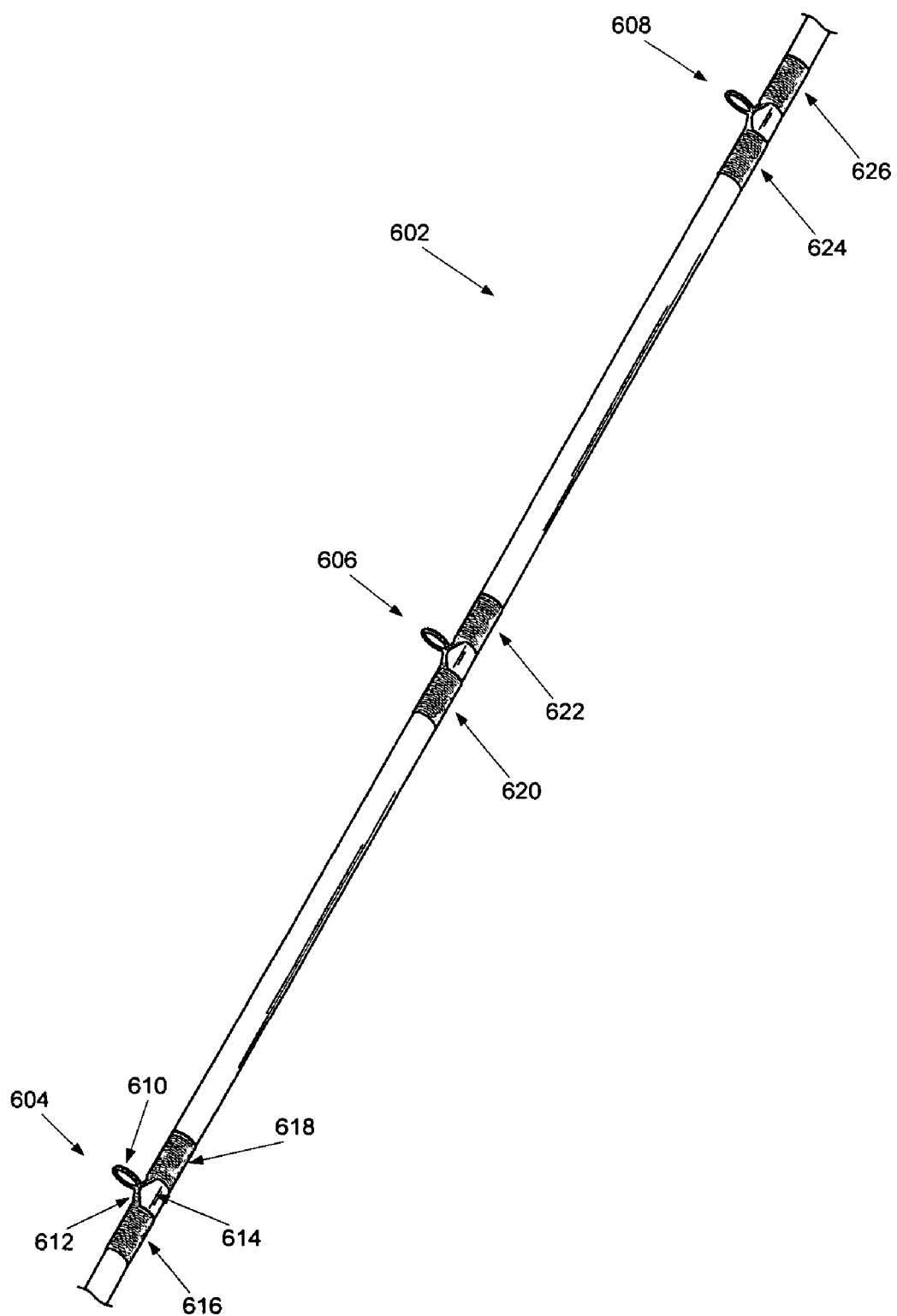
FIG. 6 illustrates a portion of a typical fishing rod.

Turning to FIG. 6, a typical fishing rod 602 is illustrated. Fishing rod 602 includes guides 604, 606 and 608 which protrude slightly from the body of the fishing rod. For purposes of illustration, it can be appreciated that guide 608 is positioned near the tip of fishing rod 602, guide 604 is positioned towards the reel and handle-end of fishing rod 602, and guide 606 is positioned towards the middle of fishing rod 602. Guides 604, 606 and 608 function to route the fishing line from the reel to the rod tip and allow for smooth casting and retrieval of the bait or lure.

As an example, guide 604 typically comprises a ring 610 which defines an opening through which the fishing line passes. Guide 604 also includes members 612 and 614. Members 612 and 614 extend from ring 610 towards the body of the fishing rod, thus positioning ring 610 slightly away from the surface of the fishing rod. Member 612 is then configured to extend toward the handle-end along fishing rod 602 while member 614 extends toward the tip along fishing rod 602.

Finally, wrap 616 and wrap 618 are applied to secure members 612 and 618, respectively, to fishing rod 602. In turn, this secures the entire guide 604, including ring 610, to fishing rod 602. Wrap 616 and wrap 618 each comprise a length of thread-like material that is repeatedly wound around the rod and then tied off to secure supporting members 612 and 614 to fishing rod 602. This process is also implemented to secure guides 606 and 608 to fishing rod 602 as illustrated by wraps 620, 622, 624 and 626. The addition of wraps 616, 618, 620, 622, 624 and 626 to fishing rod 602 results in an area which is slightly larger than the diameter of fishing rod 602 itself.

Returning now to FIG. 5, in order to provide a more secure friction fit of fishing rod 502 in tapered slot 518, fishing rod 502 should be inserted into tapered slot 518 such that a portion of wrap 526 contacts tapered slot 518 at contact points 522 and 524. Typically, wrap 520 is made from a thread-like material that is slightly more pliable than the material from which fishing rod 502 is constructed. Therefore, as the slightly pliable material of wrap 520 is inserted into tapered slot 518, a secure friction fit is established.

Figure 7:
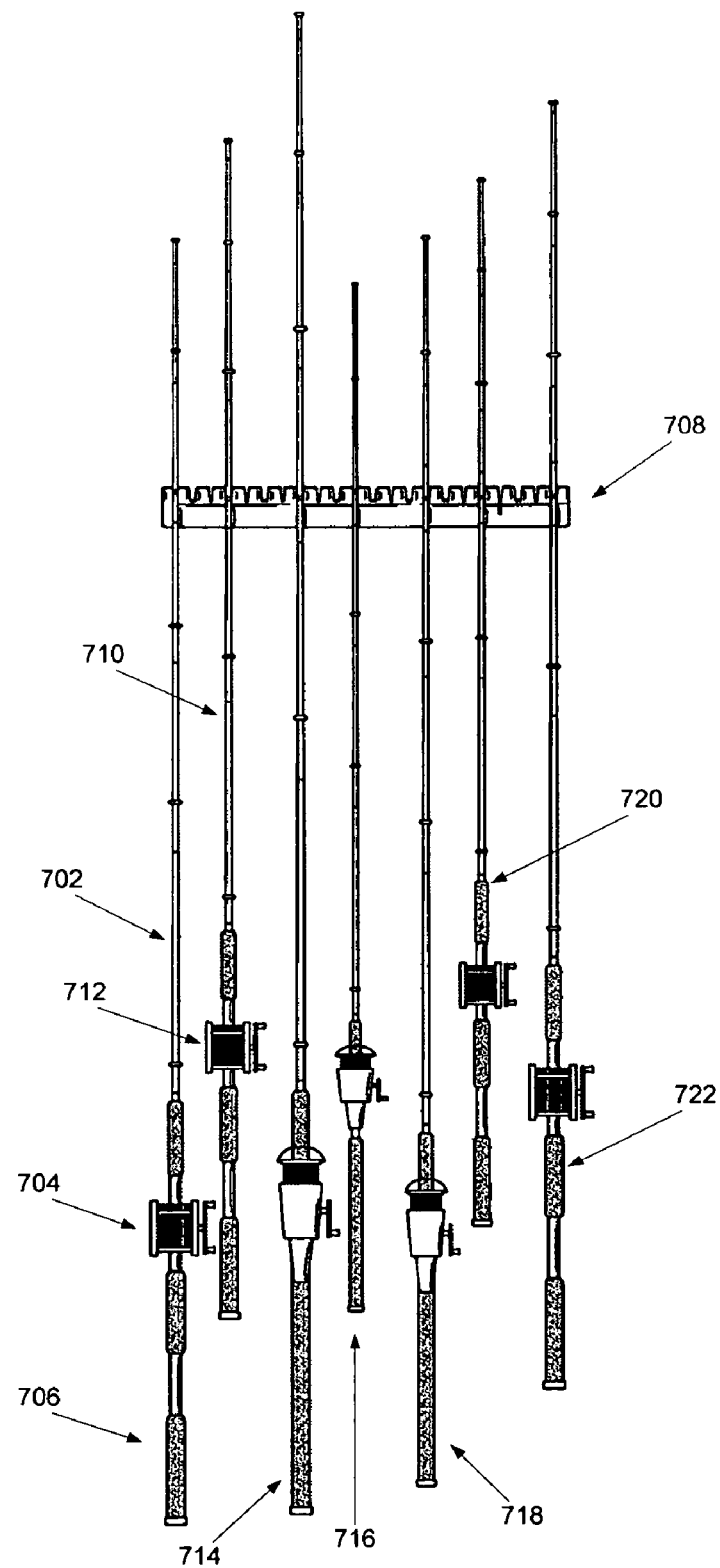
FIG. 7 illustrates an exemplary embodiment of the storage device retaining multiple fishing rods.

Turning now to FIG. 7, it can be seen that each fishing rod typically includes several guides that are each secured to the fishing rod with a wrap. In addition, fishing rods are made to have different lengths to provide the best performance in different fishing conditions. Therefore, in one embodiment of the storage devices described herein, the user has the ability to select which wrap from each fishing rod is inserted into the tapered slot to position the fishing rod at a desired height. The user can capitalize on this selection to store multiple fishing rods in the least amount of space possible with the storage device.

Exemplary fishing rod 702 demonstrates that a fishing rod typically includes a reel 704 that is attached toward the handle-end 706 of the fishing rod 702. While it is possible to remove the reel from most fishing rods, this process presents an additional inconvenience because multiple reels must be removed, stored, and reattached prior to the next use of the fishing rods. However, reel 704 is wider than the fishing rod 702 itself because reel 704 includes a housing to store a volume of fishing line. Reel 704 also includes a handle which is used to retrieve the fishing line. The handle extends even further from one side of the reel, causing the reel to be even wider than the rod. Therefore, to store multiple fishing rods adjacent to each other without removing the reel, an increased amount of storage space in needed, not because of the fishing rods, but rather because of the additional width added by the reels and their handles.

Storage device 708 can be implemented to maximize the number of fishing rods that can be stored in a given area. By selecting which wrap from each fishing rod is inserted into a tapered slot of storage device 708, the user can effectively adjust the height at which the reel and the handle-end of each fishing rod is positioned. Thus, the reels of adjacent fishing rods can be placed at different heights so that the reels do not interfere with each other as the are stored.

For example, as shown in FIG. 7, fishing rod 702 has been positioned in storage device 708 such that the wrap which secures the third guide down from the tip of fishing rod 702 is inserted into the tapered slot of storage device 708. If the wrap which secures either the first or second guide down from the tip if fishing rod 702 was inserted into the tapered slot instead, the position of reel 704 would be moved further down and away from storage device 708.

Next, the user can efficiently store fishing rod 710 adjacent to fishing rod 702 in storage device 708. The decision of which wrap of fishing rod 710 should be inserted into the tapered slot of storage device 708 is made by comparing the length of fishing rod 702 and fishing rod 710, the relative position of the wraps of the two fishing rods, and the resulting impact the positioning of each wrap would have on the position of the reel of each fishing rod. This process can easily be achieved through simple trial and error.

For example, fishing rod 710 has been positioned in storage device 708 such that the wrap which secures the fourth guide down from the tip of fishing rod 710 is inserted into the tapered slot of storage device 708. The relative length of fishing rods 702 and 710, as well as the relative positions of the wraps of fishing rods 702 and 710 result in a configuration where reel 712 of fishing rod 710 is above reel 704 of fishing rod 702. While this is not the only position that could be selected for fishing rods 702 and 710, it can be seen in FIG. 7 that if reel 704 and 712 were positioned at the same height they would interfere with each other causing the rods to bend, risking substantial damage to the rods. Therefore, the most important factor in positioning the rods is to select a wrap that will position the reel of one fishing rod above or below the reel of the adjacent fishing rod.

As shown in FIG. 7, the process described above has been repeated for storing fishing rods 714, 716, 718, 720 and 722. Each of these fishing rods may have a different length and relative position of the wraps which secure the guides to the fishing rods. However, by varying which wraps are inserted into the tapered slots of storage device 708, the reels of adjacent fishing rods can be positioned at varying heights to prevent interference of the reels. Additional fishing rods could easily be added to storage device 708 by selecting the appropriate wrap for each rod that would position the reel above or below the reels of the adjacent rods that have already been stored in storage device 708. The user can easily recognize and select which wrap of each fishing rod should be inserted into the tapered slot to ensure that the reels of adjacent rods are positioned at varying heights. By repeating this process for all rods which are stored in the plurality of tapered slots of the storage device, a maximum number of fishing rods can be stored in a given area.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed:

1. A storage device for storing objects that include a substantially cylindrical member, the storage device comprising:
    a support member;
    a retaining member coupled to the support member, the retaining member comprising a first tapered slot configured to retain a substantially cylindrical member of a first object, the retaining member further comprises a plurality of protruding members arranged substantially perpendicular to the support member to form the first tapered slot having a first width defined between the distal ends of two adjacent protruding members;
    wherein the first tapered slot is configured to retain the substantially cylindrical member of the first object through a friction fit; and
    a second tapered slot having a second width defined between the distal ends of two adjacent protruding members is adjacent to the first tapered slot and configured to retain a substantially cylindrical member of a second object through a friction fit;
    wherein the first width is different from the second width.

2. The storage device of claim 1, wherein the first tapered slot is configured to retain the substantially cylindrical member of the first object in a substantially vertical position.

3. The storage device of claim 2, wherein the first tapered slot comprises a taper angle of between 1 degree and 30 degrees.

4. The storage device of claim 2, wherein the first tapered slot comprises a taper angle of between 5 degrees and 15 degrees.

5. The storage device of claim 2, wherein the first tapered slot comprises a taper angle of about 9.5 degrees.

6. The storage device of claim 1, wherein the retaining member further comprises at least two protruding members arranged substantially perpendicular to the support member to form the second tapered slot.

7. The storage device of claim 1, wherein the second tapered slot comprises a taper angle of between 1 degree and 30 degrees.

8. The storage device of claim 7, wherein the storage device is a one-piece construction.

9. The storage device of claim 1, wherein the second tapered slot comprises a taper angle of between 5 degrees and 15 degrees.

10. The storage device of claim 1, wherein the second tapered slot comprises a taper angle of about 9.5 degrees.

11. The storage device of claim 1, wherein the support member includes a pair of mounting holes.

12. The storage device of claim 11, further comprising a plurality of tapered slots.

13. The storage device of claim 12, further comprising a plurality of protruding members arranged substantially perpendicular to the support member to form the plurality of tapered slots.

14. The storage device of claim 13, wherein the storage device is composed of metal.

15. The storage device of claim 14, wherein the retaining member further comprises a vinyl coating.

16. The storage device of claim 15, wherein the second tapered slot is configured to retain the substantially cylindrical member of the second object in a substantially vertical position.

17. The storage device of claim 13, wherein the storage device is composed of plastic.

18. A storage device for storing fishing rods, each fishing rod including a reel connected to the fishing rod and a plurality of guides, each guide secured to the fishing rod with a wrap, the storage device comprising:
   a support member;
   a retaining member coupled to the support member, the retaining member comprising a first tapered slot configured to retain a fishing rod, the retaining member further comprises a plurality of stationary protruding members arranged substantially perpendicular to the support member to form the first tapered slot between two adjacent protruding members;
   wherein the first tapered slot is configured to retain the fishing rod through a friction fit; and
   a second tapered slot adjacent to the first tapered slot configured to retain a substantially cylindrical member of a second object through a friction fit;
   wherein the first tapered slot has a first fixed taper angle that is different from a second fixed taper angle of the second tapered slot.

19. The storage device of claim 18, wherein the first tapered slot is configured to retain the fishing rod in a substantially vertical position.

20. The storage device of claim 19, wherein the first taper angle is between 1 degree and 30 degrees.

21. The storage device of claim 19, wherein the first taper angle is between 5 degrees and 15 degrees.

22. The storage device of claim 19, wherein the first taper angle is about 9.5 degrees.

23. The storage device of claim 18, wherein the retaining member further comprises at least two protruding members arranged substantially perpendicular to the support member to form the second tapered slot.

24. The storage device of claim 18, wherein the second taper angle is between 1 degree and 30 degrees.

25. The storage device of claim 24, wherein the fishing rod includes a wrap which secures a guide to the fishing rod, wherein the wrap is positioned into the first tapered slot when the fishing rod is engaged with the storage device.

26. The storage device of claim 25, wherein the second fishing rod includes a wrap which secures a guide to the second fishing rod, wherein the wrap is positioned into the second tapered slot when the second fishing rod is engaged with the storage device.

27. The storage device of claim 26, wherein the first tapered slot is configured to retain the fishing rod at a height such that the reel of the fishing rod is above the reel of the second fishing rod.

28. The storage device of claim 27, wherein the storage device is a one-piece construction.

29. The storage device of claim 28, wherein the width of the opening of the first tapered slot is greater than the width of the opening of the second tapered slot.

30. The storage device of claim 26, wherein the first tapered slot is configured to retain the fishing rod at a height such that the reel of the fishing rod is below the reel of the second fishing rod.

31. The storage device of claim 18, wherein the second taper angle is between 5 degrees and 15 degrees.

32. The storage device of claim 18, wherein the second taper angle is about 9.5 degrees.

33. The storage device of claim 18, wherein the support member includes a pair of mounting holes.

34. The storage device of claim 33, further comprising a plurality of tapered slots.

35. The storage device of claim 34, further comprising a plurality of protruding members arranged substantially perpendicular to the support member to form the plurality of tapered slots.

36. The storage device of claim 35, wherein the storage device is composed of metal.

37. The storage device of claim 36, wherein the retaining member further comprises a vinyl coating.

38. The storage device of claim 35, wherein the storage device is composed of plastic.

39. A method for storing fishing rods in a storage device, each fishing rod including a reel connected to the fishing rod and a plurality of guides, each guide secured to the fishing rod with a wrap, the method comprising:
   providing a storage device, the storage device comprising:
      a support member and a retaining member coupled to the support member, the retaining member comprising a plurality of protruding members arranged substantially perpendicular to the support member to define a plurality of tapered slots; and
   inserting a first fishing rod, such that a reel of the first fishing rod is located beneath the retaining member, into one of the plurality of tapered slots wherein the first fishing rod creates a friction fit with the tapered slot; and
   inserting a second fishing rod into another of the plurality of tapered slots wherein the second fishing rod creates a friction fit with the tapered slot and wherein the reel of the first fishing rod is positioned at an offset height from a height of a reel of the second fishing rod.

40. The method of claim 39, wherein inserting the fishing rod into the tapered slot to create the friction fit includes inserting a wrap which secures a guide to the fishing rod into the tapered slot.

41. The method of claim 39, wherein inserting the second fishing rod into the second tapered slot to create the friction fit includes inserting a wrap which secures a guide to the second fishing rod into the second tapered slot.

42. The method of claim 41, further comprising selecting a wrap of the first fishing rod to insert into the tapered slot to position the reel of the fishing rod at a first position.

43. The method of claim 42, further comprising selecting a wrap of the second fishing rod to insert into the second tapered slot to position the reel of the second fishing rod a second position.

44. The method of claim 43, further comprising selecting a wrap of the first fishing rod to insert into the tapered slot to position the reel of the fishing rod above the reel of the second fishing rod.

45. The method of claim 43, further comprising selecting a wrap of the first fishing rod to insert into the tapered slot to position the reel of the fishing rod below the reel of the second fishing rod.

46. In combination, a storage device for storing fishing rods and fishing rods, the combination comprising:
    a first fishing rod;
    a second fishing rod;
    a support member;
    a retaining member coupled to the support member, the retaining member comprising a first tapered slot having a first width defined between the distal ends of two adjacent protruding members which retains the first fishing rod through a friction fit; and
    a second tapered slot of the retaining member having a second width defined between the distal ends of two adjacent protruding members, the second slot is adjacent to the first tapered slot and retains the second fishing rod through a friction fit,
    wherein the first width is different from the second width.

47. The combination of claim 46 wherein a reel of the first fishing rod is positioned at an offset height from a height of a reel of the second fishing rod.

48. The combination of claim 46 wherein the first tapered slot has a first fixed taper angle that is different from a second fixed taper angle of the second tapered slot.

* * * * *